/ United States Patent /  (10) Patent No.: US 10,491,526 B2
Li et al.                                     (45) Date of Patent:     Nov. 26, 2019

(54) TRANSMISSION CONTROL METHOD AND APPARATUS FOR NETWORK SERVICES AND CONTROLLER

(71) Applicant: Fujitsu Limited, Kawasaki-shi, Kanagawa (JP)

(72) Inventors: Lei Li, Beijing (CN); Bo Liu, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 269 days.

(21) Appl. No.: 15/436,110

(22) Filed: Feb. 17, 2017

(65) Prior Publication Data

US 2017/0244641 A1    Aug. 24, 2017

(30) Foreign Application Priority Data

Feb. 19, 2016 (CN) .......................... 2016 1 0094640

(51) Int. Cl.
  *H04L 12/26* (2006.01)
  *H04L 12/851* (2013.01)
  *H04L 29/06* (2006.01)

(52) U.S. Cl.
  CPC .............. *H04L 47/24* (2013.01); *H04L 43/08* (2013.01); *H04L 69/00* (2013.01)

(58) Field of Classification Search
  CPC ...................................................... H04L 43/08
  See application file for complete search history.

(56) References Cited

U.S. PATENT DOCUMENTS

| 8,027,255 | B2* | 9/2011 | Kahn ................ H04W 72/1247 370/230.1 |
| 8,339,949 | B2* | 12/2012 | Sinha ...................... H04L 47/22 370/230 |
| 8,401,018 | B2* | 3/2013 | Meylan ................... H04L 47/14 370/395.4 |
| 2005/0111462 | A1* | 5/2005 | Walton ................... H04L 47/10 370/395.4 |
| 2005/0157735 | A1* | 7/2005 | Kan ........................ H04L 47/24 370/412 |
| 2007/0291765 | A1* | 12/2007 | Boley ..................... H04L 47/10 370/395.21 |
| 2008/0052394 | A1* | 2/2008 | Bugenhagen ........... H04L 12/14 709/224 |

(Continued)

*Primary Examiner* — Guang W Li
(74) *Attorney, Agent, or Firm* — Staas & Halsey LLP (57) ABSTRACT

A transmission control method and apparatus for network services and controller. The transmission control method for network services includes: negotiating, before start of the network services, operational modes supported by each of links, and detecting quality of services in the operational modes supported by each of the links; grouping all network services to be transmitted according to requirements of the network services on quality of services and the quality of services in the operational modes supported by each of the links, and allocating links and operational modes for each of the groups; and designating a link for each of the network services in the groups according to the links and operational modes allocated for each of the groups. Hence, abilities of transmission quality detection and adjustment of a multi-carrier optical communication system may be used to satisfy quality requirements of different network services.

15 Claims, 6 Drawing Sheets

(56) References Cited

U.S. PATENT DOCUMENTS

| | | | |
|---|---|---|---|
| 2009/0116404 A1* | 5/2009 | Mahop | H04L 41/0213 370/254 |
| 2013/0322255 A1* | 12/2013 | Dillon | H04L 47/22 370/236 |
| 2015/0040121 A1* | 2/2015 | Barabash | G06F 9/45558 718/1 |
| 2016/0295210 A1* | 10/2016 | Deng | H04L 65/80 |
| 2016/0359755 A1* | 12/2016 | Li | H04W 4/06 |

* cited by examiner

TRANSMISSION CONTROL METHOD AND APPARATUS FOR NETWORK SERVICES AND CONTROLLER

CROSS-REFERENCE TO RELATED APPLICATIONS

This application claims the benefit of Chinese Application No. 201610094640.2, filed Feb. 19, 2016, in the Chinese Intellectual Property Office, the disclosure of which is incorporated herein by reference.

BACKGROUND

1. Field

This disclosure relates to the field of communications, and in particular to a transmission control method and apparatus for network services and a controller.

2. Description of the Related Art

Currently, although new types of network services emerge in an endless stream, requirements of quality of services (QoSs) of different network services, such as a data throughput, latency, and a bit error rate, etc., are different. Taking a cloud calculation center as an example, a throughput required by a service of large-scale data backup may be as high as several thousands of Gb/s, and the backup service is less sensitive to latency; and on the contrary, a throughput required by coordination calculation between servers may be less than 1 Gb/s, but the coordination calculation has a very high requirement on the latency.

In order to deal with different requirements on data throughput, Google and Cisco proposed the concept of the FlexEthernet, which supports to slice and map a network service of very large data throughput onto multiple physical ports (multiple sub-MAC streams) or to combine and map multiple network services of small throughput onto one physical port (one MAC stream).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in slicing, combining and mapping network services, only throughput requirements of network services and rates of physical ports are considered by the FlexEthernet, and following two point are not considered: first, transmission performances of different physical ports may possibly be different, for example, latency and bit error rates that can be provided by the physical ports may possibly be different; and second, requirements of different network services on latency and bit error rates may possibly be not completely identical. Hence, although the FlexEthernet may achieve matches of requirements of different network services on throughput and rates of physical ports, quality of services of the network services cannot be ensured.

In order to solve the above problems, embodiments of this disclosure provide a transmission control method and apparatus for network services and a controller.

According to a first aspect of the embodiments of this disclosure, there is provided a transmission control method for network services, including before start of the network services, operational modes supported by each of links are negotiated, and quality of services in each of the operational modes supported by each of the links is detected, all network services to be transmitted are grouped according to requirements of the network services on quality of services and the quality of services in each of the operational modes supported by each of the links, and links and operational modes are allocated for each of the groups. The transmission control methods further includes a link for each of the network services in each of the groups is designated according to the links and the operational modes allocated for each of the groups.

According to a second aspect of the embodiments of this disclosure, there is provided a transmission control apparatus for network services, including a negotiation detecting unit configured to, before start of the network services, negotiate operational modes supported by each of links, and detect quality of services in each of the operational modes supported by each of the links, an allocating unit configured to group all network services to be transmitted according to requirements of the network services on quality of services and the quality of services in each of the operational modes supported by each of the links, and allocate links and operational modes for each of the groups. The transmission control apparatus further includes a designating unit configured to designate a link for each of the network services in each of the groups according to the links and the operational modes allocated for each of the groups.

According to a third aspect of the embodiments of this disclosure, there is provided a controller, configured to before start of the network services, negotiate operational modes supported by each of links, and detect quality of services in each of the operational modes supported by each of the links, group all network services to be transmitted according to requirements of the network services on quality of services and the quality of services in each of the operational modes supported by each of the links, and allocate links and operational modes for each of the groups. The controller is also configured to designate a link for each of the network services in each of the groups according to the links and operational modes allocated for each of the groups.

An advantage of the embodiments of this disclosure exists in that with the embodiments of this disclosure, smooth achievement of network services may be ensured.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

Additional aspects and/or advantages will be set forth in part in the description which follows and, in part, will be apparent from the description, or may be learned by practice of the invention.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings.

Figure 1:
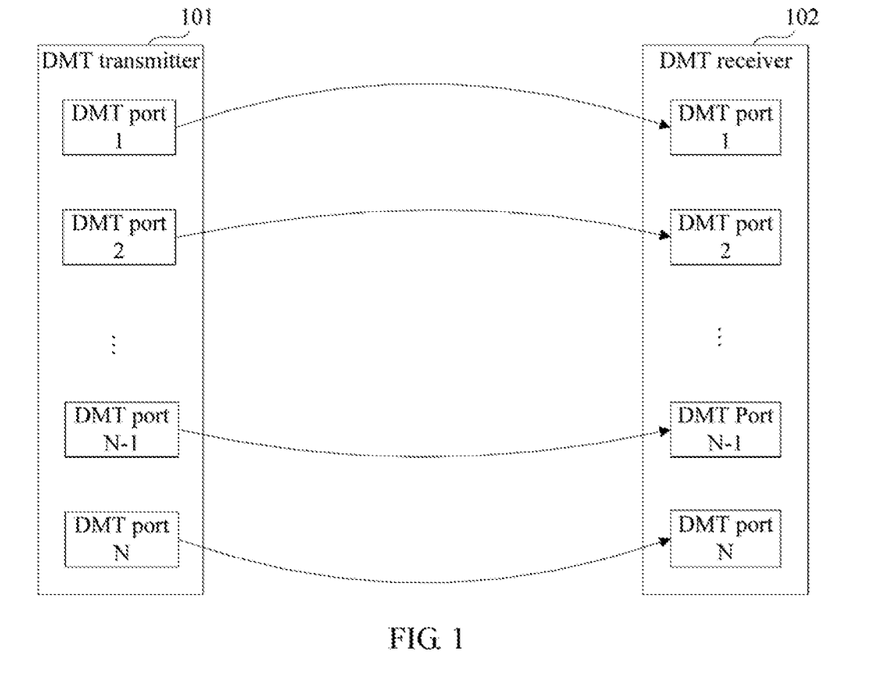
FIG. 1 is a schematic diagram of a discrete multi-tone (DMT) optical communication system.

FIG. 1 shows an optical communication system including N (N≥1) physical ports supporting the DMT technology. As shown in FIG. 1, the system includes a DMT transmitter 101 and a DMT receiver 102. The DMT transmitter 101 and the DMT receiver 102 respectively include N physical ports supporting the DMT technology. In order to map network services having different requirements on data throughput rates onto the physical ports, Google and Cisco proposed the concept of the FlexEthernet, the core of which being taking data throughput rates of the physical ports as an only standard for configuring network services to the ports. If a throughput rate required by a network service is greater than a rate of a physical port, the network services are sliced to multiple ports (bonding); and if a throughput rate required by a network services is less than a rate of a physical port, the network service is combined with other network services to one physical port (sub-rate).

The FlexEthernet satisfies requirements of network services on data throughput rates as possible by slicing, combining and mapping the network services at multiple physical ports. However, a data throughput rate is not a unique content required by quality of service of a network service, and latency and a bit error rate are also known important components of requirements of quality of service. If latency or a bit error rate does not reach the requirements of quality of service, the network services are not available even though the data throughput rate is satisfied.

Figure 2:
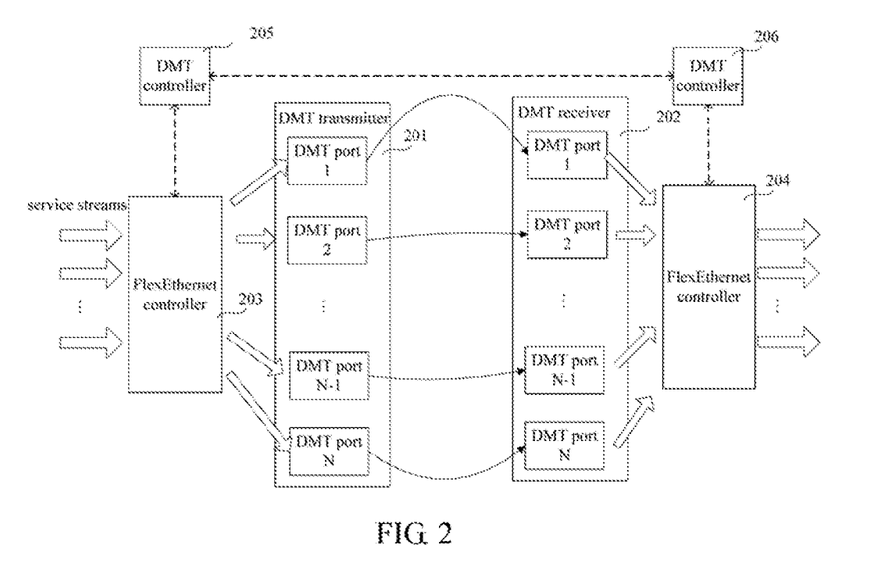
FIG. 2 is a schematic diagram of a DMT optical communication system according to an embodiment of this disclosure.

FIG. 2 shows a schematic diagram of a DMT optical communication system according to an embodiment of this disclosure. As shown in FIG. 2, the system includes a DMT transmitter 201, a DMT receiver 202, FlexEthernet controllers 203 and 204, and DMT controllers 205 and 206.

The DMT transmitter 201 and the DMT receiver 202 respectively include N (N≥1) physical ports supporting the DMT technology.

The DMT controllers 205 and 206 are used to carry out the method and apparatus of the embodiments of this disclosure. In the embodiment, the DMT controller 205 at a transmitter end is in communication with the FlexEthernet controller 203 at the transmitter end, reads demand information of network services from the FlexEthernet controller 203, and feeds back mapping information obtained through calculation by using the control method of the embodiment of this disclosure to the FlexEthernet controller 203; the DMT controller 206 at a receiver end and the DMT controller 205 at the transmitter end are in communication via a control channel, exchange related information of physical ports, and negotiate particular configuration of the ports; and at the same time, the DMT controller 206 at the receiver end has ability to communicate with the FlexEthernet controller 204 at the receiver end, and notifies the FlexEthernet controller 204 at the receiver end of changes of port mapping. Implementations of the DMT controllers 205 and 206 shall be described later.

The FlexEthernet controller 203 is responsible for combining or slicing network services needing to be transmitted by the transmitter end, and mapping them onto corresponding physical ports after adding relevant FlexEthernet identification; and the FlexEthernet controller 204 is responsible for performing corresponding inverse operations on the received data streams according to the FlexEthernet identification, combining or slicing the data streams received at the physical ports, so as to restore the transmitted network services. In the known art, the FlexEthernet controllers 203 and 204 perform the combination and slicing of the network services only according to the data throughput rates required by the network services and nominal rates of the physical ports. For example, a network service of a data throughput rate of 100 Gb/s will be sliced to four physical ports of a nominal rate of 25 Gb/s, without considering performance, such as latency, and a bit error rate, etc., differences possibly existing between the four physical ports; likewise, multiple network services of data throughput rates lower than nominal rate of a physical port will be combined to the same physical port, without considering differences on latency, and a bit error rate, etc., between the network services.

In order to solve the problem in the FlexEthernet that a physical layer performance does not match with a requirement of a network service, the embodiments of this disclosure propose a method for detecting performances of physical ports based on the DMT technology, configuring operational modes of DMT ports according to a QoS requirement of the network service, and then performing mapping.

Various implementations of the embodiments of this disclosure shall be described below with reference to the accompanying drawings. These implementations are illustrative only, and are not intended to limit this disclosure.

Embodiment 1

Figure 3:
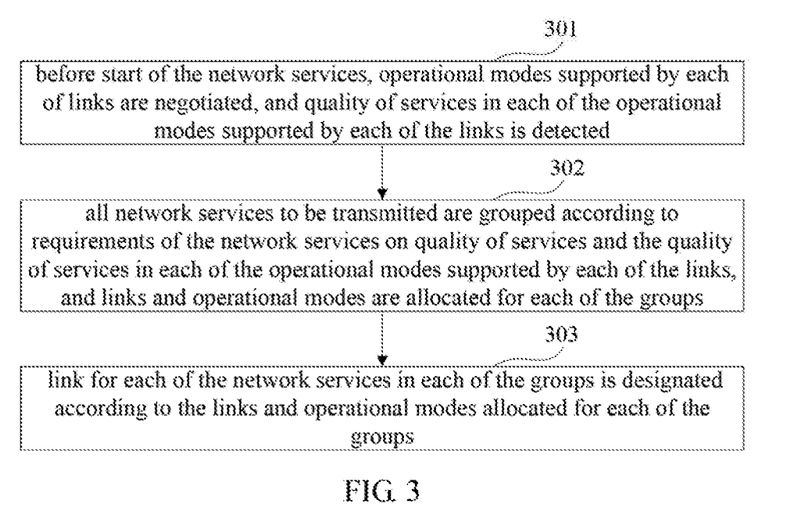
FIG. 3 is a flowchart of the transmission control method for network services of an embodiment of this disclosure.

This embodiment provides a transmission control method for network services, applicable to the DMT controller 205 and the DMT controller 206 shown in FIG. 2. FIG. 3 is a flowchart of the method. As shown in FIG. 3, the method includes:

step 301: before start of the network services, operational modes supported by each of links are negotiated, and quality of services in each of the operational modes supported by each of the links is detected;

step 302: all network services to be transmitted are grouped according to requirements of the network services on quality of services and the quality of services in each of the operational modes supported by each of the links, and links and operational modes are allocated for each of the groups; and step 303: a link for each of the network services in each of the groups is designated according to the links and operational modes allocated for each of the groups.

In this embodiment, each of the links supports multiple operational modes, and all network services to be transmitted are grouped according to requirements of the network services on quality of services by negotiating the operational modes supported by each of the links and detecting the quality of services in each of the operational modes supported by each of the links, so as to select links and operational modes for each of the groups and for each of the network services in each of the groups, thereby satisfying different requirements of the network services on quality of services and ensuring smooth achievement of the network services.

In this embodiment, after designating a link for each of the network services in each of the groups, a correspondence relationship between network services and links may be reported, and particular bits and power allocation may be designated for the links. Hence, states of the links may be set to be ready for transmission, waiting for an instruction for starting transmission from a network management layer.

Figure 4:
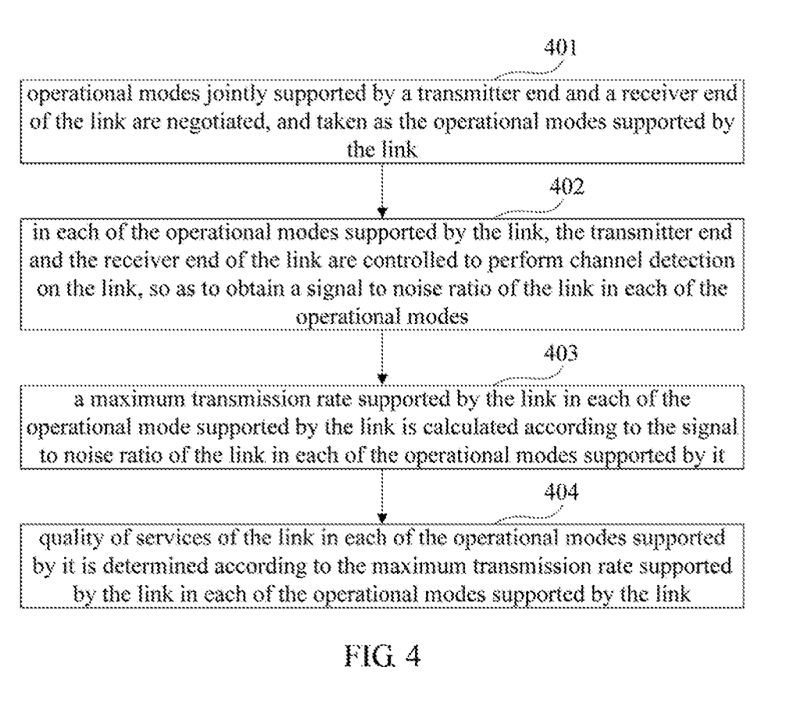
FIG. 4 is a schematic diagram of an implementation of a transmission control method for network services of an embodiment of this disclosure.

In step 301, before the start of the network services, the operational modes supported by each of links (physical ports of a transmitter end and physical ports of a receiver end) may be negotiated and the quality of services provided by each of the links in each of the operational modes supported by each of the links may be detected. In an implementation, for each link, a method shown in FIG. 4 may be used to negotiate the operational modes supported by the link and detect the quality of services provided by the link in each of the operational modes supported by the link. As shown in FIG. 4, the method includes:

step 401: operational modes jointly supported by a transmitter end and a receiver end of the link are negotiated, and taken as the operational modes supported by the link;

step 402: in each of the operational modes supported by the link, the transmitter end and the receiver end of the link are controlled to perform channel detection on the link, so as to obtain a signal to noise ratio of the link in each of the operational modes;

step 403: a maximum transmission rate supported by the link in each of the operational mode supported by the link is calculated according to the signal to noise ratio of the link in each of the operational modes supported by it; and step 404: quality of services of the link in each of the operational modes supported by it is determined according to the maximum transmission rate supported by the link in each of the operational modes supported by the link.

The method shown in FIG. 4 shall be described below taking a link X as an example.

In step 401, for the link X, the DMT controller 205 at the transmitter end and the DMT controller 206 at the receiver end may communicate via a control channel, negotiate operational modes jointly supported by the transmitter end and the receiver end for the link X, and take the operational modes as the operational modes that can be supported by the link X. Contents of the operational mode include the number of subcarriers of a DMT signal, configuration of a selectable performance enhancement circuit (such as a nonlinear compensation circuit), a type of an error correction code, and a coding gain, etc. With step 401, a list of operational modes that can be supported by the link X (such as modes 1-N) and indices to which each of the operational modes corresponds, such as hardware processing latency, and power consumption, etc., may be obtained.

In step 402, for each operational mode supported by the link X, such as a mode 1 supported by the link X, the DMT controller 205 notifies the transmitter end and the receiver end of the link X, by communicating with the DMT controller 206, to perform channel detection on the link X in the mode 1, a process of the channel detection being not limited in this embodiment. By the channel detection, signal to noise ratios of subcarriers of the link X in the mode 1 are obtained, which are referred to as signal to noise ratios of the link X in the operational mode 1.

In step 403, according to the signal to noise ratios, the DMT controller 205 may calculate a maximum transmission rate supported by the link X in each of the operational modes, a process of calculation being not limited in this embodiment.

In step 404, according to the maximum transmission rate of the link X in each of the operational modes, quality of services of the link X in the operational modes may be determined, so as to obtain information on the quality of services of the link X in the operational modes.

In this embodiment, the above information on the quality of services may include one or more of the following indices or a combination thereof: a data throughput that can be supported by a link, transmission latency of a link, an output bit error rate of a link, and power consumption of a link. In this embodiment, the data throughput that can be supported by a link refers to a maximum transmission rate that can be supported by an operational mode subtracted by redundancy of error correction codes in the operational mode, the redundancy of error correction codes being a known quantity determined by the operational mode. The transmission latency of a link refers to processing latency of a receiver end and a transmitter end, which is a known quantity determined by an operational mode. The output bit error rate of a link is a known quantity determined by a type of an error correction code in an operational mode. And the power consumption of a link is a known quantity determined by configuration of hardware processing modules in an operational mode. Furthermore, the above quality of services may include other indices that are not listed.

All the links are processed according to the method shown in FIG. 4, thereby obtaining information on quality of services of all the links in supported operational modes.

Table 1 shows an example of the information on quality of services. As shown in Table 1, taking a link 1 as an example, in an operational mode 1, a data throughput rate of the link 1 is minimum, and an output bit error rate is maximum, but transmission latency is minimum, and power consumption is minimum; in an operational mode 2, the error correction code is replaced with a more complex type, and a level of the output bit error rate is increased, but the latency and the power consumption are correspondingly increased; and in an operational mode 3, the number of subcarriers is increased or a selectable performance enhancement circuit (such as a nonlinear compensation circuit) is opened, and the data throughput rate of the link 1 is greatly increased, but the latency and the power consumption have to be increased to new levels.

TABLE 1

| Link | Mode1 | Mode 2 | Mode 3 | ... |
|---|---|---|---|---|
| 1 | Throughput rate: 50 Gb/s<br>Latency: 50 ns<br>BER: $10^{-11}$<br>Power: 200 mW | Throughput rate: 51 Gb/s<br>Latency: 80 ns<br>BER: $10^{-13}$<br>Power: 300 mW | Throughput rate: 100 Gb/s<br>Latency: 1000 ns<br>BER: $10^{-15}$<br>Power: 1000 mW | ... |
| 2 | Throughput rate: 40 Gb/s<br>Latency: 50 ns<br>BER: $10^{-11}$<br>Power: 200 mW | Throughput rate: 39 Gb/s<br>Latency: 80 ns<br>BER: $10^{-13}$<br>Power: 300 mW | Throughput rate: 90 Gb/s<br>Latency: 1000 ns<br>BER: $10^{-15}$<br>Power: 1000 mW | ... |
| ... | ... | ... | ... | ... |
| N − 1 | Throughput rate: 45 Gb/s<br>Latency: 50 ns<br>BER: $10^{-11}$<br>Power: 200 mW | Throughput rate: 44 Gb/s<br>Latency: 80 ns<br>BER: $10^{-13}$<br>Power: 300 mW | Throughput rate: 95 Gb/s<br>Latency: 1000 ns<br>BER: $10^{-15}$<br>Power: 1000 mW | ... |
| N | Throughput rate: 55 Gb/s<br>Latency: 50 ns<br>BER: $10^{-11}$<br>Power: 200 mW | Throughput rate: 56 Gb/s<br>Latency: 80 ns<br>BER: $10^{-13}$<br>Power: 300 mW | Throughput rate: 120 Gb/s<br>Latency: 1000 ns<br>BER: $10^{-15}$<br>Power: 1000 mW | ... |

Different from a transmission of a conventional on-off key (OOK), in this embodiment, flexible configuration of the DMT signal enables a transmission system to support different operational modes. In the different operational modes, tradeoff of key quality indices of a network service, such as a data throughput rate, latency, and a bit error rate, etc., are different from each other and are closely related to physical features of a link itself. In this embodiment, a combination of tradeoffs of quality indices that can be provided by the system shown in Table 1 is obtained by the link negotiation and detection shown in FIG. 4, so as to satisfy different requirements of different network services on quality in a most efficient manner.

In this embodiment, a process of detecting the quality of services of the links in the supported operational modes is not limited. In an implementation, each operational mode supported by each link may be processed respectively. For example, for the link X, the operational mode of the link X is set to be the mode 1 first, then channel quality of the link X in the mode 1 is detected, so as to obtain a signal to noise ratio of the link X in the mode 1, thereby calculating a maximum transmission rate that can be supported of the link X in the mode 1 and obtaining the quality of services of the link X in the mode 1; thereafter, the operational mode of the link X is set to be a next supported operational mode, such as a mode 2, and the above processing is repeated, so as to obtain the quality of services of the link X in the mode 2, and so on. In another implementation, for operational modes supported by each link, processing may be performed in parallel according to steps 402-404. For example, when the above processing is performed on the link X in the mode 1, the same processing is also performed on the link X in the mode 2, and so on. Hence, the quality of services of the link X in various modes is directly obtained. Likewise, for the links, processing may be performed respectively or in parallel. For example, when the above processing is performed on the link X, the above processing is also performed on a link X+1; or after the above processing is performed on the link X, the above processing is performed on the link X+1.

In this embodiment, after the link negotiation and detection are finished in step 301, step 302 may be performed, such that all the network services to be transmitted may be grouped according to the requirements of the network services on quality of services and the links and operational modes may be allocated for the groups.

In this embodiment, the network services to be transmitted and respective requirements on quality of services may be obtained from the FlexEthernet controllers or the network management layer, the requirements on quality of services here including such parameters as data throughput rates, upper limits of bit error rates, and upper limits of latency, etc., required by the network services. Table 2 shows an example of obtained network services and their requirements on quality of services. In this example, total five network services to be transmitted, denoted as service streams 1, 2, 3, 4 and 5, and data throughput rates, bit error rates and latency required by the network services, are obtained.

TABLE 2

| Service streams # | Throughput rates | Bit error rates | Latency |
|---|---|---|---|
| 1 | 120 Gb/s | $<10^{-15}$ | <2000 ns |
| 2 | 40 Gb/s | $<10^{-13}$ | <1500 ns |
| 3 | 100 Gb/s | $<10^{-13}$ | <200 ns |
| 4 | 50 Gb/s | $<10^{-11}$ | <60 ns |
| 5 | 40 Gb/s | $<10^{-10}$ | <80 ns |

Figure 5:
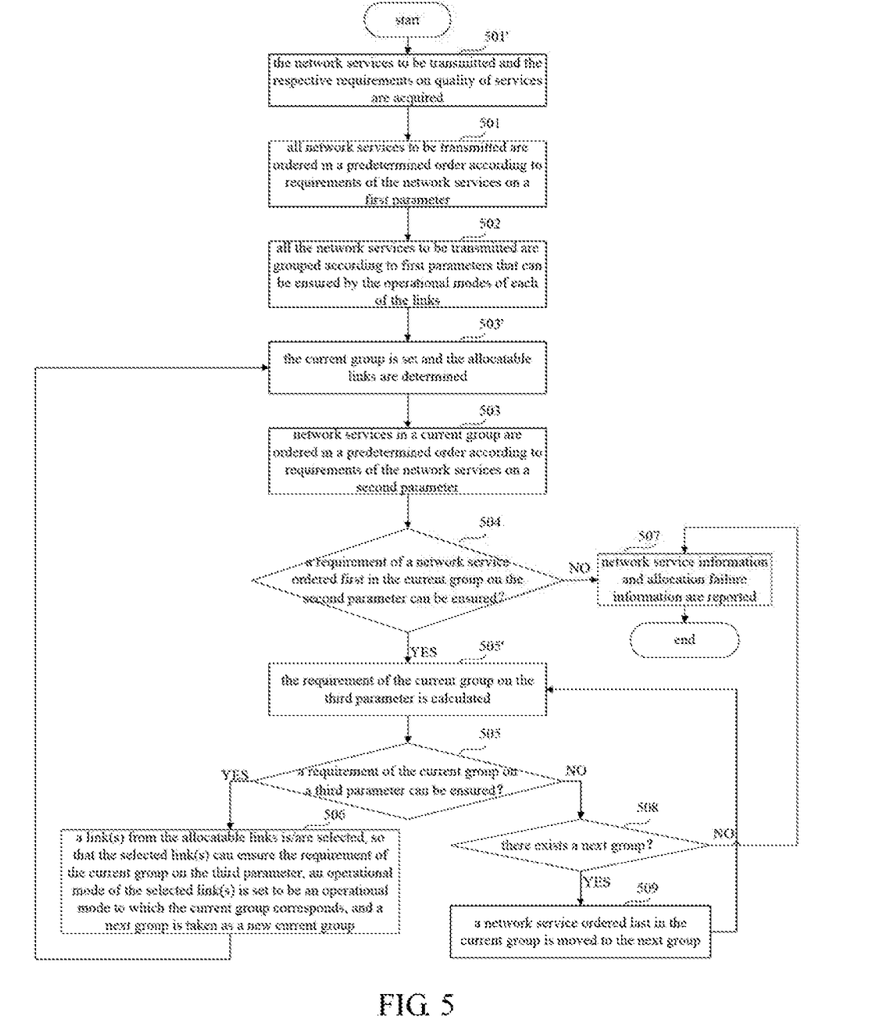
FIG. 5 is a schematic diagram of an implementation a transmission control method for network services of an embodiment of this disclosure.

In an implementation, step 302 may be carried out by using the method shown in FIG. 5. As shown in FIG. 5, the method includes:

step 501: all network services to be transmitted are ordered in a predetermined order according to requirements of the network services on a first parameter;

step 502: all the network services to be transmitted are grouped according to first parameters that can be ensured by the operational modes of each of the links;

step 503: network services in a current group are ordered in a predetermined order according to requirements of the network services on a second parameter;

step 504: it is judged whether a requirement of a network service ordered first in the current group on the second parameter can be ensured;

for example, whether the requirement of the network service ordered first in the current group on the second parameter can be ensured is determined by comparing the requirement of the network service ordered first in the current group on the second parameter with a second parameter that can be ensured by an operational mode to which the current group corresponds; and if the required second parameter is less than the second parameter that can be ensured, it is determined that the requirement can be ensured; otherwise, it is deemed that the requirement cannot be ensured;

when the requirement of the network service ordered first in the current group on the second parameter can be ensured, step 505 is executed; otherwise, step 507 is executed;

step 505: it is judged whether a requirement of the current group on a third parameter can be ensured;

for example, whether the requirement of the current group on the third parameter can be ensured is determined by comparing the requirement of the current group on the third parameter with a third parameter that can be provided by allocatable links in a corresponding operational mode; if the required third parameter is less than the third parameter that can be provided, it is determined that the requirement can be ensured; otherwise, it is deemed that the requirement cannot be ensured; here, the requirement of the current group on the third parameter may be a sum of third parameters of all network services in the current group, and the third parameter that can be provided by the allocatable links in a corresponding operational mode may be a sum of third parameters that can be provided by the allocatable links in the corresponding operational mode;

when the requirement of the current group on the third parameter can be ensured, step 506 is executed; otherwise, step 508 is executed;

step 506: a link(s) from the allocatable links is/are selected, so that the selected link(s) can ensure the requirement of the current group on the third parameter, an operational mode of the selected link(s) is set to be an operational mode to which the current group corresponds, and a next group is taken as a new current group.

In this implementation, all the network services to be transmitted are grouped according to the first parameter, each group corresponding to an operational mode, thereby operational modes that can be employed by the network services of the groups can be determined. Furthermore, for the current group, the network services in the group are ordered according to the second parameter, and when the requirement of the network service ordered first in the current group on the second parameter can be ensured and the requirement of the current group on the third parameter can be ensured, the link(s) is/are selected from allocatable links for the current group, so that the selected link(s) can ensure the requirement of the current group on the third parameter. Therefore, the power consumption of the system is lowered as possible while ensuring the quality of services of the network services.

In this implementation, as shown in FIG. 5, the method may further include:

step 507: network service information and allocation failure information are reported.

In this implementation, if it is judged no in step 504, that is, when the requirement of the network service ordered first in the current group on the second parameter cannot be ensured, the corresponding network service information and allocation failure information may be reported, such as reporting to the network management layer, and then the allocation process may exit.

In this implementation, as shown in FIG. 5, the method may further include:

step 508: it is judged whether there exists a next group; in this implementation, if there exists a next group, step 509 is executed; otherwise, step 507 is executed;

step 509: a network service ordered last in the current group is moved to the next group.

In this implementation, if it is judged no in step 505, that is, when the requirement of the current group on the third parameter cannot be ensured, whether there exists a next group may be judged. And at this moment, as the requirement of the current group on the third parameter cannot be ensured, if there exists a next group of relatively high power consumption, a network service in the current group having a relatively low requirement on the second parameter may be moved to the next group, thereby lowering the power consumption of the system as possible while ensuring the quality of services of the network services.

In this implementation, if there exists no next group of relatively high power consumption, the corresponding network service information and allocation failure information may be reported, and then the allocation process may exit.

In this implementation, as shown in FIG. 5, before step 501, the network services to be transmitted and the respective requirements on quality of services may be acquired (step 501'), an acquisition method being as described above, and being not going to be described herein any further. And before step 503, the current group may be set and the allocatable links may be determined (step 503'). Furthermore, before step 505, the requirement of the current group on the third parameter may be calculated (step 505'), so as to judge whether the requirement of the current group on the third parameter can be ensured.

In order that the method of this implementation is clear and easy to be understood, the method of this embodiment shall be described below taking the information on the quality of services of the links shown in Table 1 and the requirements of the five network services on the parameters shown in Table 2 as examples. In the following description, the first parameter being a bit error rate, the second parameter being latency and the third parameter being a throughput rate are taken as examples. However, this embodiment is not limited thereto, and in particular implementation, orders of judgment of the parameters may be adjusted based on application demand, or other unlisted parameters may be added or judgment of a parameter or some parameters may be reduced based on application demand, and FIG. 5 may be referred to.

In step 501, the five network services shown in Table 2 are ordered in a descending order according to the requirements of the five network services on the upper limits of the bit error rates. As shown in Table 2, the requirements of the five network services on the upper limits of the bit error rates are $10^{-15}$, $10^{-13}$, $10^{-13}$, $10^{-11}$, $10^{-10}$, and a result of ordering of the five network services is 5, 4, 2, 3, 1, or 5, 4, 3, 2, 1.

In step 502, the above five network services are grouped according to the first parameters that can be ensured by the operational modes of the links shown in Table 1. As shown in Table 1, the upper limit of the bit error rate that can be ensured by the mode 1 of the links is $10^{-11}$, the upper limit of the bit error rate that can be ensured by the mode 2 of the links is $10^{-13}$, the upper limit of the bit error rate that can be ensured by the mode 3 of the links is $10^{-15}$, and the result of grouping of the five network services is that 5 and 4 are in the first group, 2 and 3 are in the second group, and 1 is in the third group. Hence, the upper limits of the bit error rates required by the network services are ensured by the operational modes to which the groups correspond, and the network services of each group correspond to one operational mode. With such grouping, it may ensure as possible that the links operate in modes of relatively low power consumption, and the power consumption of the transmission system is lowered.

In step 503', the first group having a most loose requirement on the bit error rate may be set to be the current group, and at the same time, all the links are set to be allocatable. Hence, the process where links may be allocated for the network services in each of the groups according to the requirement on the latency and the requirements on the data throughput rates may be entered.

In step 503, the network services in the current group may be ordered in an ascending order according to the upper limits of the latency required by them. As described above, the ordering result of the network services of the first group is 4, 5, and the ordering result of the network services of the second group is 3, 2.

In step 504, the upper limit of the latency required by the network service ordered first in the current group may be compared with the upper limit of the latency that can be ensured by the operational mode to which the current group corresponds, so as to determine whether the required upper limit of the latency can be ensured. In this implementation, if the upper limit of the latency required by the network service ordered first in the current group is less than the upper limit of the latency that can be ensured by the operational mode to which the current group corresponds, it shows that the requirements of all the network services in the current group on the latency may be ensured. In this implementation, if the required upper limit of the latency cannot be ensured, the corresponding network service information and allocation failure information may be notified to the network management layer (step 507), then the allocation process exits. In this implementation, if the required upper limit of the latency can be ensured, whether the requirement of the current group on the data throughput rate can be ensured may be judged in step 505. In this implementation, for the first group of network services, an upper limit of latency of a network service 4 ordered first is 60 ns, and an upper limit of latency that can be ensured by the mode 1 to which the group corresponds is 50 ns. As 60 ns $\not<$ 50 ns, it is judged that the required upper limit of the latency cannot be ensured.

In step 505, data throughput rates required by all the network services in the current group may be added up to obtain a required total throughput rate, and then throughput rates that can be provided by all the allocatable links in the corresponding operational mode may be added up to obtain an available total throughput rate. And the total throughput rate required by the current group is compared with the available total throughput rate, so as to judge whether the requirement of the current group on the throughput rate can be ensured.

In step 505, if the required total throughput rate is greater than the available total throughput rate, it shows that the throughput rates that can be provided by the links in the corresponding operational mode are insufficient, and then whether there exists a next group of relatively high power consumption may be looked up (step 508), if yes, a last network service (that is, a network service having a most loose requirement on the latency) in the current group may be moved to the next group, then turn back to step 505', and an allocation attempt is performed again on the changed current group. If it is found in step 508 that there exists no next group, the allocated network service information and allocation failure information may be reported to the network management layer (step 507), and the allocation process exits.

In step 505, if the required total throughput rate is less than the available total throughput rate, it shows that the requirement of the current group on the throughput rate can be ensured, and step 506 may be executed; and links are selected from the links that are not allocated, so that a sum of throughput rates of the selected links is greater than or equal to the requirement of the current group. Then the selected links are marked as having been selected, and operational mode of the selected links is set to be the operational mode to which the current group corresponds. Thereafter, the next group is set to be the current group, and process turns back to step 503 to start the allocation process, until allocation for all the groups are finished.

With the grouping of the network services and the setting of the operational modes of the links shown in FIG. 5, the embodiment of this disclosure lowers the power consumption of the system as possible while ensuring the quality of services of the network services.

In this embodiment, with steps 301 and 302, the quality of network services that can be supported by the links are obtained, the network services are grouped according to the requirements of the network services on the quality of services, and corresponding links and the operational modes of the links are selected for the groups. Hence, in step 303, particular links may be designated for the network services in each group.

In step 303, the designated links are the links allocated for the group in step 302, and the data throughput rates of the designated links are greater than or equal to a sum of the data throughput rates required by the network services carried by the links. And orders of designating the links for the network services between the groups and within each group are not limited in this embodiment.

In this embodiment, after the processing of all the network services is finished, the DMT controller may notify the correspondence relationship between network services and links to the FlexEthernet controller, and the FlexEthernet controller performs corresponding MAC layer processing. Hence, the DMT controller obtains the data throughput rates that should be carried by the links, and in conjunction with the operational mode designated in step 302, the DMT controller may designate particular bit and power allocation for the links, a method for designating particular bit and power allocation is not limited in this embodiment. Thus, the DMT controller finishes designating links and the operational modes of the links according to the requirements of the network services on quality of services, and quality of services are ensured. Furthermore, the DMT controller may further set states of the links to be ready for transmission, waiting for an instruction for starting transmission from a network management layer.

Figure 6:
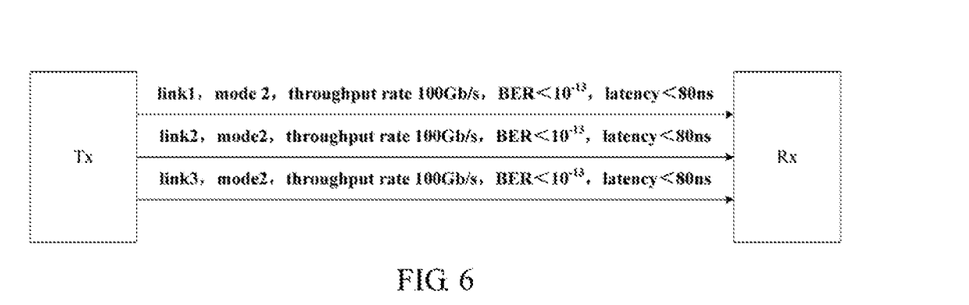
FIG. 6 is a schematic diagram of a link allocation result obtained according to an existing link allocation method.

FIG. 6 is a schematic diagram of a link allocation result according to an existing link allocation method, which is regarding to the requirements on the quality of services of the network services shown in Table 2. As shown in FIG. 6, for the requirements on the quality of services of the network services shown in Table 2, the known art assumes that the operational modes of the links are same, rather than adjusting the operational modes of the links. For example, the links operate in the operational mode 2, and in such a mode, assuming that the three links can provide a data throughput rate of 100 Gb/s while ensuring that the bit error rate is not greater than $10^{-13}$ (for the sake of simplicity, a case where the performances of the links are different is not taken into account in this example), a result of processing is as shown in Table 3. As the known art does not adjust the links according to the requirements on the quality of services of the network services and other requirements on the quality of services than the throughput rate are not taken into account in processing the mapping, three of the five network services of this example cannot be smoothly transmitted.

TABLE 3

| Service stream # | Requirement on throughput rate | Requirement on bit error rate | Requirement on latency | Link mapping | Mapping result |
|---|---|---|---|---|---|
| 1 | 120 Gb/s | $<10^{-15}$ | <2000 ns | Link 1 and link 2 | Failed (BER overflow) |
| 2 | 40 Gb/s | $<10^{-13}$ | <1500 ns | Link 2 | Pass |
| 3 | 100 Gb/s | $<10^{-13}$ | <200 ns | Link 2 and link 3 | Pass |
| 4 | 50 Gb/s | $<10^{-11}$ | <60 ns | N/A | Failed |
| 5 | 40 Gb/s | $<10^{-10}$ | <80 ns | N/A | Failed |

Figure 7:
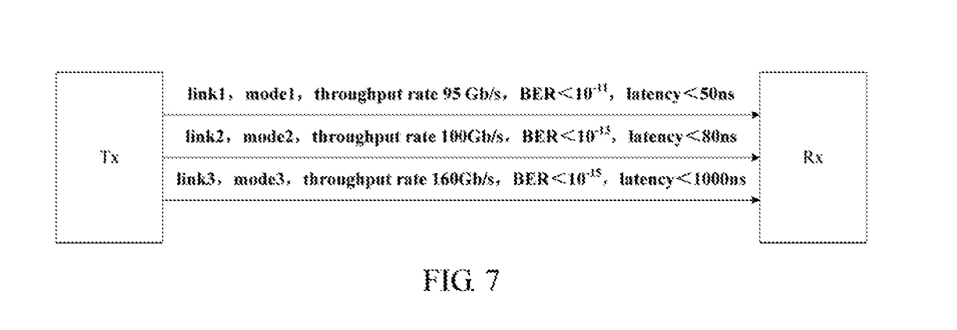
FIG. 7 is a schematic diagram of a link allocation result obtained according to a link allocation method of the embodiment.

FIG. 7 is a schematic diagram of a link allocation result according to the link allocation method of this embodiment, which is regarding to the requirements on the quality of services of the network services shown in Table 2, and Table 4 shows a processing result of this embodiment. As shown in FIG. 7 and Table 4, based on the detection of the ensurance of quality of services that can be provided by the links, the operational modes of the links are set in this embodiment according to the requirements of the network services on the quality. In this example, the link 1 is set to be operating in the mode 1, the link 2 is set to be operating in the mode 2, and the link 3 is set to be operating in the mode 3. And at the same time, the network services are mapped to the links according the respective requirements on the quality, thereby ensuring smooth transmission of all the network services.

TABLE 4

| Service stream # | Requirement on throughput rate | Requirement on bit error rate | Requirement on latency | Link mapping | Mapping result |
|---|---|---|---|---|---|
| 1 | 120 Gb/s | $<10^{-15}$ | <2000 ns | Link 3 | Pass |
| 2 | 40 Gb/s | $<10^{-13}$ | <1500 ns | Link 3 | Pass |
| 3 | 100 Gb/s | $<10^{-13}$ | <200 ns | Link 2 | Pass |
| 4 | 50 Gb/s | $<10^{-11}$ | <60 ns | Link 1 | Pass |
| 5 | 40 Gb/s | $<10^{-10}$ | <80 ns | Link 1 | Pass |

With the method of this embodiment, the requirements on various quality of services including a throughput rate, latency and a bit error rate may fully be taken into account in performing slicing, combination and mapping on the network services, thereby ensuring smooth achievement of the network services.

Embodiment 2

This embodiment provides a transmission control apparatus for network services, which may be configured in a transmitter or a receiver of an optical communication system, may be configured in other devices of the optical communication system, or may be configured in a standalone controller, the controller may be configured in the above transmitter or receiver or optical communication system. As principles of the apparatus for solving problems are similar to that of the method of Embodiment 1, the implementation of the method of Embodiment 1 may be referred to for a particular implementation of the apparatus, with identical contents being not going to be described herein any further.

Figure 8:
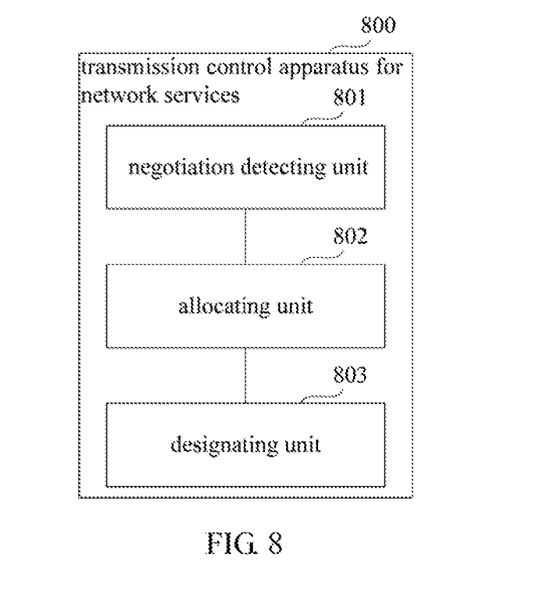
FIG. 8 is a schematic diagram of the transmission control apparatus for network services of an embodiment of this disclosure.

FIG. 8 is a schematic diagram of the apparatus. As shown in FIG. 8, the apparatus 800 includes a negotiation detecting unit 801, an allocating unit 802 and a designating unit 803.

The negotiation detecting unit 801 is configured to, before start of the network services, negotiate operational modes supported by each of links, and detect quality of services in each of the operational modes supported by each of the links.

The allocating unit 802 is configured to group all network services to be transmitted according to requirements of the network services on quality of services and the quality of services in each of the operational modes supported by each of the links, and allocate links and operational modes for each of the groups.

And the designating unit 803 is configured to designate a link for each of the network services in each of the groups according to the links and the operational modes allocated for each of the groups.

Figure 9:
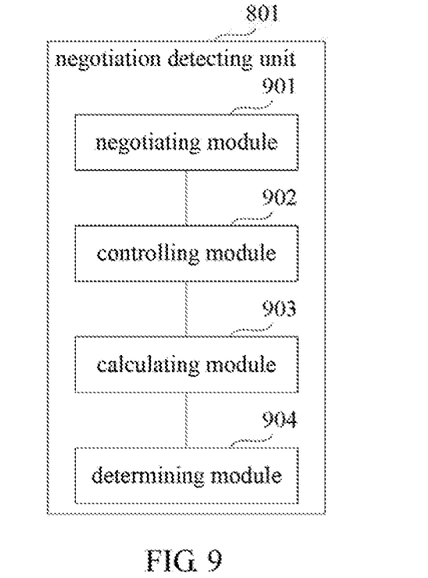
FIG. 9 is a schematic diagram of a negotiation detecting unit of the apparatus shown in FIG. 8.

In an implementation of this embodiment, as shown in FIG. 9, the negotiation detecting unit 801 includes a negotiating module 901, a controlling module 902, a calculating module 903 and a determining module 904.

In this implementation, for each link, the negotiating module 901 negotiates operational modes jointly supported by a transmitter end and a receiver end of the link, and takes them as the operational modes supported by the link; in each of the operational modes supported by the link, the controlling module 902 controls the transmitter end and the receiver end of the link to perform channel detection on the link, so as to obtain a signal to noise ratio of the link in the operational mode; the calculating module 903 calculates a maximum transmission rate supported by the link in the operational mode according to the signal to noise ratio; and the determining module 904 determines quality of services of the link in the operational modes according to maximum transmission rates of the link in the operational modes.

Figure 10:
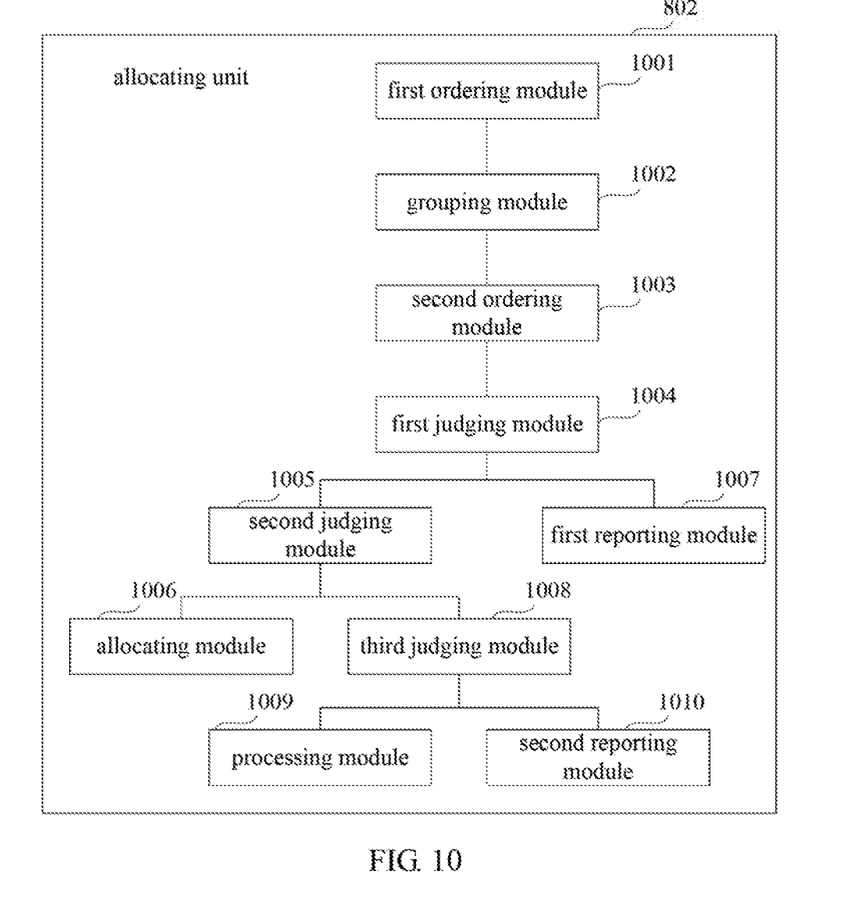
FIG. 10 is a schematic diagram of an allocating unit of the apparatus shown in FIG. 8.

In an implementation of this embodiment, as shown in FIG. 10, the allocating unit 802 includes a first ordering module 1001, a grouping module 1002, a second ordering module 1003, a first judging module 1004, a second judging module 1005 and an allocating module 1006.

In this implementation, the first ordering module 1001 orders all network services to be transmitted in a predetermined order according to requirements of the network services on a first parameter; the grouping module 1002 groups all the network services according to first parameters that can be ensured by the operational modes of each of the links; the second ordering module 1003 orders network services in a current group in a predetermined order according to requirements of the network services on a second parameter; the first judging module 1004 judges whether a requirement of a network service ordered first in the current group on a second parameter can be ensured; the second judging module 1005, when a judgment result of the first judging module 1004 is that the requirement of the network service ordered first in the current group on the second parameter can be ensured, judges whether a requirement of the current group on a third parameter can be ensured; and the allocating module 1006, when a judgment result of the second judging module 1005 is that the requirement of the current group on the third parameter can be ensured, selects a link(s) from links that are not allocated, so that the selected link(s) can ensure the requirement of the current group on the third parameter, sets an operational mode of the selected link(s) to be an operational mode to which the current group corresponds, and takes a next group as a new current group.

In this implementation, as shown in FIG. 10, the allocating unit 802 may further include a first reporting module 1007, which is configured to, when the judgment result of the first judging module 1004 is that the requirement of the network service ordered first on the second parameter cannot be ensured, report network service information and allocation failure information.

In this implementation, as shown in FIG. 10, the allocating unit 802 may further include a third judging module 1008, a processing module 1009 and a second reporting module 1010.

In this implementation, when the judgment result of the second judging module 1005 is that the requirement of the current group on the third parameter cannot be ensured, the third judging module 1008 judges whether there exists a next group; when a judgment result of the third judging module 1008 is that there exists a next group, the processing module 1009 moves a network service ordered last in the current group to the next group, and turns back to the second judging module 1005 to judge whether a requirement of a new current group on the third parameter can be ensured; and when the judgment result of the third judging module 1008 is that there exists no next group, the second reporting module 1010 reports network service information and allocation failure information.

In this implementation, the first judging module 1004 may determine whether the requirement of the network service ordered first in the current group on the second parameter can be ensured by comparing the requirement of the network service ordered first in the current group on the second parameter with a second parameter that can be ensured by the operational mode to which the current group corresponds. In this implementation, the second judging module 1005 may determine whether the requirement of the current group on the third parameter can be ensured by comparing the requirement of the current group on the third parameter with a third parameter that can be provided by allocatable links in a corresponding operational mode.

In this implementation, the requirement of the current group on the third parameter may be: a sum of third parameters of all network services in the current group; and the third parameter that can be provided by the allocatable links in the corresponding operational mode may be: a sum of third parameters that can be provided by the allocatable links in the corresponding operational mode.

With the method of this embodiment, the requirements on various quality of services including a throughput rate, latency and a bit error rate may fully be taken into account in performing slicing, combination and mapping on the network services, thereby ensuring smooth achievement of the network services.

Embodiment 3

Figure 11:
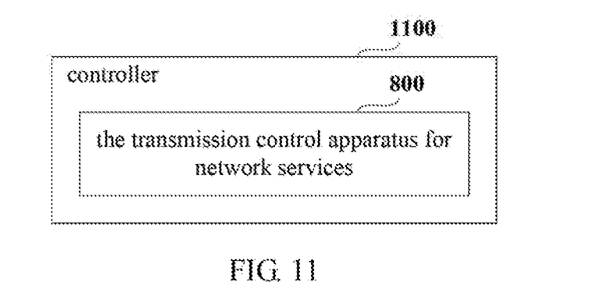
FIG. 11 is a schematic diagram of a controller of an embodiment of this disclosure.

This embodiment further provides a controller. FIG. 11 is a schematic diagram of the controller. As shown in FIG. 11, the controller 1100 includes the transmission control apparatus 800 for network services described in Embodiment 2. As the transmission control apparatus 800 for network services has been described in Embodiment 2, the contents of which being incorporated herein, and being not going to be described herein any further.

In this embodiment, the controller 1100 may be configured in a transmitter of an optical communication system, may be configured in a receiver of the optical communication system, or may be configured in other devices of the optical communication system. Furthermore, the controller 1100 may be configured separately, as shown in FIG. 2, a part of which being taken as a DMT controller of a transmitter end, and the other part being taken as a DMT controller of a receiver end, and functioning respectively at the transmitter end and the receiver end.

With the controller of this embodiment, the requirements on various quality of services including a throughput rate, latency and a bit error rate may fully be taken into account in performing slicing, combination and mapping on the network services, thereby ensuring smooth achievement of the network services.

Embodiment 4

An embodiment of this disclosure further provides a communication system. FIG. 2 is a schematic diagram of a structure of the communication system. As shown in FIG. 2, the communication system 200 includes a DMT transmitter 201, a DMT receiver 202, FlexEthernet controllers 203 and 204, and DMT controllers 205 and 206. In this embodiment, structures and functions of the DMT controllers 205 and 206 are identical to those described in Embodiment 3, which shall not be described herein any further. The DMT transmitter 201, DMT receiver 202 and FlexEthernet controllers 203 and 204 may have the same structures and functions as a DMT transmitter, a DMT receiver and FlexEthernet controllers in the prior art, and the structures and functions of the DMT transmitter 201, DMT receiver 202 and FlexEthernet controllers 203 and 204 are not limited in the embodiment of this disclosure.

In this embodiment, the DMT controllers 205 and 206 being independent of the transmitter 201 and the receiver 202 is taken as an example. In particular implementation, the DMT controllers 205 and 206 may also be configured in the transmitter 201 or the receiver 202 or other devices of the communication system.

With the communication system of this embodiment, the requirements on various quality of services including a throughput rate, latency and a bit error rate may fully be taken into account in performing slicing, combination and mapping on the network services, thereby ensuring smooth achievement of the network services.

An embodiment of the present disclosure provides a computer readable program code, which, when executed in a controller, will cause the controller to carry out the method as described in Embodiment 1.

An embodiment of the present disclosure provides a computer readable medium, including a computer readable program code, which will cause a controller to carry out the method as described in Embodiment 1.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For implementations of the present disclosure containing the above embodiments, following supplements are further disclosed.

Supplement 1. A transmission control apparatus for network services, including:

a negotiation detecting unit configured to, before start of the network services, negotiate operational modes supported by each of links, and detect quality of services in each of the operational modes supported by each of the links;

an allocating unit configured to group all network services to be transmitted according to requirements of the network services on quality of services and the quality of services in each of the operational modes supported by each of the links, and allocate links and operational modes for each of the groups; and a designating unit configured to designate a link for each of the network services in each of the groups according to the links and the operational modes allocated for each of the groups.

Supplement 2. The apparatus according to supplement 1, wherein the negotiation detecting unit includes:

a negotiating module configured to, for each link, negotiate operational modes jointly supported by a transmitter end and a receiver end of the link, and take them as the operational modes supported by the link;

a controlling module configured to, in each of the operational modes supported by the link, control the transmitter end and the receiver end of the link to perform channel detection on the link, so as to obtain a signal to noise ratio of the link in the operational mode;

a calculating module configured to calculate a maximum transmission rate supported by the link in the operational mode according to the signal to noise ratio; and a determining module configured to determine quality of service of the link in the operational modes according to maximum transmission rates of the link in the operational modes.

Supplement 3. The apparatus according to supplement 1, wherein the allocating unit includes:

a first ordering module configured to order all network services to be transmitted in a predetermined order according to requirements of the network services on a first parameter;

a grouping module configured to group all the network services according to first parameters that can be ensured by the operational modes of each of the links;

a second ordering module configured to order network services in a current group in a predetermined order according to requirements of the network services on a second parameter;

a first judging module configured to judge whether a requirement of a network service ordered first in the current group on a second parameter can be ensured;

a second judging module configured to, when a judgment result of the first judging module is that the requirement of the network service ordered first in the current group on the second parameter can be ensured, judge whether a requirement of the current group on a third parameter can be ensured; and an allocating module configured to, when a judgment result of the second judging module is that the requirement of the current group on the third parameter can be ensured, select a link(s) from links that are not allocated, so that the selected link(s) can ensure the requirement of the current group on the third parameter, set an operational mode of the selected links to be an operational mode to which the current group corresponds, and take a next group as a new current group.

Supplement 4. The apparatus according to supplement 3, wherein the allocating unit further includes:

a first reporting module configured to, when the judgment result of the first judging module is that the requirement of the network service ordered first on the second parameter cannot be ensured, report corresponding network service information and allocation failure information.

Supplement 5. The apparatus according to supplement 3, wherein the allocating unit further includes:

a third judging module configured to, when the judgment result of the second judging module is that the requirement of the current group on the third parameter cannot be ensured, judge whether there exists a next group;

a processing module configured to, when a judgment result of the third judging module is that there exists a next group, move a network service ordered last in the current group to the next group, and turn back to the second judging module to judge whether a requirement of a new current group on the third parameter can be ensured; and a second reporting module configured to, when the judgment result of the third judging module is that there exists no next group, report corresponding network service information and allocation failure information.

Supplement 6. The apparatus according to supplement 3, wherein the first judging module determines whether the requirement of the network service ordered first in the current group on the second parameter can be ensured by comparing the requirement of the network service ordered first in the current group on the second parameter with a second parameter that can be ensured by the operational mode to which the current group corresponds.

Supplement 7. The apparatus according to supplement 3, wherein the second judging module determines whether the requirement of the current group on the third parameter can be ensured by comparing the requirement of the current group on the third parameter with a third parameter that can be provided by allocatable links in a corresponding operational mode.

Supplement 8. The apparatus according to supplement 7, wherein, the requirement of the current group on the third parameter is: a sum of third parameters of all network services in the current group;

and the third parameter that can be provided by the allocatable links in the corresponding operational mode is: a sum of third parameters that can be provided by the allocatable links in the corresponding operational mode.

Supplement 9. A transmission control method for network services, including:

negotiating, before start of the network services, operational modes supported by each of links, and detecting quality of services in each of the operational modes supported by each of the links;

grouping all network services to be transmitted according to requirements of the network services on quality of services and the quality of services in each of the operational modes supported by each of the links, and allocating links and operational modes for each of the groups; and designating a link for each of the network services in each of the groups according to the links and operational modes allocated for each of the groups.

Supplement 10. The method according to supplement 9, wherein, for each link, operational modes jointly supported by a transmitter end and a receiver end of the link is negotiated, and taken as the operational modes supported by the link;

in each of the operational modes supported by the link, the transmitter end and the receiver end of the link are controlled to perform channel detection on the link, so as to obtain a signal to noise ratio of the link in the operational mode;

a maximum transmission rate supported by the link in the operational mode is calculated according to the signal to noise ratio of the link in the operational mode; and quality of services of the link in the operational modes supported by it is determined according to maximum transmission rates of the link in the operational modes.

Supplement 11. The method according to supplement 9, wherein, ordering all network services to be transmitted in a predetermined order according to requirements of the network services on a first parameter;

grouping all the network services according to first parameters that can be ensured by the operational modes of each of the links;

ordering network services in a current group in a predetermined order according to requirements of the network services on a second parameter;

judging whether a requirement of a network service ordered first in the current group on a second parameter can be ensured;

when a judgment result of the first judging module is that the requirement of the network service ordered first in the current group on the second parameter can be ensured, judging whether a requirement of the current group on a third parameter can be ensured; and when a judgment result of the second judging module is that the requirement of the current group on the third parameter can be ensured, selecting a link (s) from links that are not allocated, so that the selected link(s) can ensure the requirement of the current group on the third parameter, setting an operational mode of the selected links to be an operational mode to which the current group corresponds, and taking a next group as a new current group.

Supplement 12. The method according to supplement 11, wherein, when the requirement of the network service ordered first on the second parameter cannot be ensured, corresponding network service information and allocation failure information are reported.

Supplement 13. The method according to supplement 11, wherein, when the requirement of the current group on the third parameter cannot be ensured, whether there exists a next group is judged;

when there exists a next group, a network service ordered last in the current group is moved to the next group, so as to judge whether a requirement of a new current group on the third parameter can be ensured; and when there exists no next group, corresponding network service information and allocation failure information are reported.

Supplement 14. The method according to supplement 11, wherein whether the requirement of the network service ordered first in the current group on the second parameter can be ensured is determined by comparing the requirement of the network service ordered first in the current group on the second parameter with a second parameter that can be ensured by the operational mode to which the current group corresponds.

Supplement 15. The method according to supplement 11, wherein whether the requirement of the current group on the third parameter can be ensured is determined by comparing the requirement of the current group on the third parameter with a third parameter that can be provided by allocatable links in a corresponding operational mode.

Supplement 16. The method according to supplement 15, wherein, the requirement of the current group on the third parameter is: a sum of third parameters of all network services in the current group;

and the third parameter that can be provided by the allocatable links in the corresponding operational mode is: a sum of third parameters that can be provided by the allocatable links in the corresponding operational mode.

Supplement 17. A controller, configured to:

before start of the network services, negotiate operational modes supported by each of links, and detect quality of services in the operational modes supported by each of the links;

group all network services to be transmitted according to requirements of the network services on quality of services and the quality of services in the operational modes supported by each of the links, and allocate links and operational modes for each of the groups; and designate a link for each of the network services in the groups according to the links and operational modes allocated for each of the groups.

What is claimed is:

1. A transmission control apparatus for network services, comprising:

at least one hardware processor to implement:

a negotiation detecting unit configured to, before start of the network services, negotiate operational modes supported by each of links, and detect quality of services in each of the operational modes supported by each of the links, the negotiation detecting unit including a negotiating module configured to, for each link, negotiate operational modes jointly supported by a transmitter end and a receiver end of the link, as the operational modes supported by the link, a controlling module configured to, in each of the operational modes supported by the link, control the transmitter end and the receiver end of the link to perform channel detection on the link, so as to obtain a signal to noise ratio of the link in an operational mode among the operational modes, a calculating module configured to calculate a maximum transmission rate supported by the link in the operational mode according to the signal to noise ratio, and a determining module configured to determine quality of services of the link in the operational modes according to maximum transmission rate of the link in the operational modes;

an allocating unit configured to group all network services to be transmitted according to requirements of the network services for quality of services and the quality of services in each of the operational modes supported by each of the links, and allocate links and operational modes for each group; and a designating unit configured to designate a link for each of the network services in each group according to the links and the operational modes allocated for each group.

2. The apparatus according to claim 1, wherein the allocating unit comprises:

a first ordering module configured to order all the network services to be transmitted in a predetermined order according to requirements of the network services for a first parameter;

a grouping module configured to group all the network services according to first parameters that will be ensured by the operational modes of each of the links;

a second ordering module configured to order network services in a current group in a predetermined order according to requirements of the network services for a second parameter;

a first judging module configured to judge whether a requirement of a network service ordered first in the current group for a second parameter is ensured;

a second judging module configured to, when a judgment result of the first judging module is that the requirement of the network service ordered first in the current group for the second parameter is ensured, judge whether a requirement of the current group for a third parameter is ensured; and an allocating module configured to, when a judgment result of the second judging module is that the requirement of the current group for the third parameter is ensured, select links from links that are not allocated, so that the selected links will ensure the requirement of the current group for the third parameter, set an operational mode of the selected links to be an operational mode to which the current group corresponds, and take a next group as a new current group.

3. The apparatus according to claim 2, wherein the allocating unit further comprises: a first reporting module configured to, when the judgment result of the first judging module is that the requirement of the network service ordered first for the second parameter is not ensured, report corresponding network service information and allocation failure information.

4. The apparatus according to claim 2, wherein the allocating unit further comprises:

a third judging module configured to, when the judgment result of the second judging module is that the requirement of the current group for the third parameter is not ensured, judge whether there exists a next group;

a processing module configured to, when a judgment result of the third judging module is that there exists a next group, move a network service ordered last in the current group to the next group, and turn back to the second judging module to judge whether a requirement of a new current group on the third parameter is ensured; and a second reporting module configured to, when the judgment result of the third judging module is that there exists no next group, report corresponding network service information and allocation failure information.

5. The apparatus according to claim 2, wherein the first judging module determines whether the requirement of the network service ordered first in the current group for the second parameter is ensured by comparing the requirement of the network service ordered first in the current group for the second parameter with a second parameter that will be ensured by the operational mode to which the current group corresponds.

6. The apparatus according to claim 2, wherein the second judging module determines whether the requirement of the current group for the third parameter is ensured by comparing the requirement of the current group for the third parameter with a third parameter that will be provided by allocatable links in a corresponding operational mode.

7. The apparatus according to claim 6, wherein, the requirement of the current group on the third parameter is: a sum of third parameters of all network services in the current group;

and the third parameter that will be provided by the allocatable links in the corresponding operational mode is: a sum of third parameters that will be provided by the allocatable links in the corresponding operational mode.

8. A transmission control method for network services, comprising:

negotiating, before start of the network services, operational modes supported by each of links, and detecting quality of services in each of the operational modes supported by each of the links, by for each link, negotiating operational modes jointly supported by a transmitter end and a receiver end of the link, as the operational modes supported by the link, in each of the operational modes supported by the link, controlling the transmitter end and the receiver end of the link to perform channel detection on the link, so as to obtain a signal to noise ratio of the link in an operational mode among the operational modes, calculating a maximum transmission rate supported by the link in the operational mode according to the signal to noise ratio, and determining quality of services of the link in the operational modes according to maximum transmission rate of the link in the operational modes;

grouping all network services to be transmitted according to requirements of the network services for quality of services and the quality of services in each of the operational modes supported by each of the links, and allocating links and operational modes for each group; and designating a link for each of the network services in each group according to the links and operational modes allocated for each group.

9. The method according to claim 8, wherein, ordering all network services to be transmitted in a predetermined order according to requirements of the network services for a first parameter;

grouping all the network services according to first parameters that will be ensured by the operational modes of the links;

ordering network services in a current group in a predetermined order according to requirements of the network services for a second parameter;

judging whether a requirement of a network service ordered first in the current group for a second parameter is ensured;

when a judgment result of the first judging module is that the requirement of the network service ordered first in the current group for the second parameter is ensured, judging whether a requirement of the current group for a third parameter is ensured; and when a judgment result of the second judging module is that the requirement of the current group for the third parameter is ensured, selecting a link (s) from links that are not allocated, so that the selected link(s) will ensure the requirement of the current group for the third parameter, setting an operational mode of the selected links to be an operational mode to which the current group corresponds, and taking a next group as a new current group.

10. The method according to claim 9, wherein, when the requirement of the network service ordered first for the second parameter is not ensured, corresponding network service information and allocation failure information are reported.

11. The method according to claim 9, wherein,
when the requirement of the current group for the third parameter is not ensured, whether there exists a next group is judged;
when there exists a next group, a network service ordered last in the current group is moved to the next group, so as to judge whether a requirement of a new current group for the third parameter is ensured; and
when there exists no next group, corresponding network service information and allocation failure information are reported.

12. The method according to claim 9, wherein whether the requirement of the network service ordered first in the current group for the second parameter is ensured is determined by comparing the requirement of the network service ordered first in the current group for the second parameter with a second parameter that will be ensured by the operational mode to which the current group corresponds.

13. The method according to claim 9, wherein whether the requirement of the current group for the third parameter is ensured is determined by comparing the requirement of the current group for the third parameter with a third parameter that will be provided by allocatable links in a corresponding operational mode.

14. The method according to claim 13, wherein,
the requirement of the current group for the third parameter is: a sum of third parameters of all network services in the current group;
and the third parameter that will be provided by the allocatable links in the corresponding operational mode is a sum of third parameters that will be provided by the allocatable links in the corresponding operational mode.

15. A controller, configured to:
negotiate, before start of the network services, operational modes supported by each of links, and detect quality of services in each of the operational modes supported by each of the links, by
for each link, negotiating operational modes jointly supported by a transmitter end and a receiver end of the link, as the operational modes supported by the link;
in each of the operational modes supported by the link, controlling the transmitter end and the receiver end of the link to perform channel detection on the link, so as to obtain a signal to noise ratio of the link in an operational mode among the operational modes;
calculating a maximum transmission rate supported by the link in the operational mode according to the signal to noise ratio; and
determining quality of services of the link in the operational modes according to maximum transmission rate of the link in the operational modes;
group all network services to be transmitted according to requirements of the network services for quality of services and the quality of services in each of the operational modes supported by each of the links, and allocate links and operational modes for each group; and
designate a link for each of the network services in each group according to the links and operational modes allocated for each group.

* * * * *